US010789430B2

(12) United States Patent
Lev Tov et al.

(10) Patent No.: US 10,789,430 B2
(45) Date of Patent: Sep. 29, 2020

(54) METHOD AND SYSTEM FOR SENTIMENT ANALYSIS

(71) Applicant: Genesys Telecommunications Laboratories, Inc., Daly City, CA (US)

(72) Inventors: Amir Lev Tov, Tel Aviv (IL); Avraham Faizakof, Tel Aviv (IL); Arnon Mazza, Tel Aviv (IL); Yochai Konig, San Francisco, CA (US)

(*) Notice: Subject to any disclaimer, the term of this patent is extended or adjusted under 35 U.S.C. 154(b) by 136 days.

(21) Appl. No.: 16/194,758

(22) Filed: Nov. 19, 2018

(65) Prior Publication Data

US 2020/0159826 A1   May 21, 2020

(51) Int. Cl.
*G06F 40/00* (2020.01)
*G06F 40/35* (2020.01)
*G06K 9/62* (2006.01)
*G06F 40/284* (2020.01)

(52) U.S. Cl.
CPC ............ *G06F 40/35* (2020.01); *G06F 40/284* (2020.01); *G06K 9/6259* (2013.01)

(58) Field of Classification Search
CPC .................................. G06F 40/30; G06F 40/35
See application file for complete search history.

(56) References Cited

U.S. PATENT DOCUMENTS

| | | | |
|---|---|---|---|
| 8,417,713 B1 | 4/2013 | Blair-Goldensohn et al. | |
| 9,275,041 B2 | 3/2016 | Ghosh et al. | |
| 9,704,097 B2* | 7/2017 | Devarajan | G06F 40/289 |
| 2012/0246054 A1 | 9/2012 | Sastri | |
| 2012/0303622 A1* | 11/2012 | Dean | G06F 16/355 707/737 |
| 2016/0004977 A1* | 1/2016 | Shi | G06N 99/005 706/12 |
| 2016/0179782 A1 | 6/2016 | Boguraev et al. | |
| 2016/0283462 A1 | 9/2016 | Galle et al. | |
| 2017/0116173 A1 | 4/2017 | Lev-Tov et al. | |
| 2017/0206890 A1 | 7/2017 | Tapuhi et al. | |
| 2017/0206891 A1 | 7/2017 | Lev-Tov et al. | |
| 2018/0267955 A1* | 9/2018 | Catalano | G06F 40/284 |
| 2020/0065716 A1* | 2/2020 | Aharonov | G06F 40/30 |

OTHER PUBLICATIONS

International Search Report and Written Opinion of the International Searching Authority dated Feb. 7, 2019 in related PCT application PCT/US2018/061782 filed Nov. 19, 2018.
Ding, Xiaowen, et al. "A holistic lexicon-based approach to opinion mining." Proceedings of the 2008 international conference on web search and data mining. ACM, 2008, pp. 231-240.
Taboada, Maite, et al. "Lexicon-based methods for sentiment analysis." Computational linguistics 2011. vol. 37 No. 2, pp. 267-307.

(Continued)

*Primary Examiner* — Daniel Abebe

(57) ABSTRACT

Methods, systems, and computer program product for automatically performing sentiment analysis on texts, such as telephone call transcripts and electronic written communications. Disclosed techniques include, inter alia, lexicon training, handling of negations and shifters, pruning of lexicons, confidence calculation for token orientation, supervised customization, lexicon mixing, and adaptive segmentation.

33 Claims, 5 Drawing Sheets

(56) References Cited

OTHER PUBLICATIONS

Marneffe et al., "Was it good? It was provocative. Learning the meaning of scalar adjectives", Proceedings of the 48th Annual Meeting of the Association for Computational Linguistics, Jul. 2010, pp. 167-176.

Minqing Hu et al, "Mining and summarizing customer reviews", in Proceedings of ACM SIGKDD KDD, 2004, pp. 168-177.

Kennedy, Alistair et al, "Sentiment classification of movie reviews using contextual valence shifters", Computational Intelligence, 2006, vol. 22 No. 2, pp. 110-125.

Richard Socher et al., "Recursive deep models for semantic compositionality over a sentiment treebank" in Proceedings of EMNLP, Oct. 2013, pp. 1631-1642.

Bo Pang et al., "Thumbs up? Sentiment Classification using Machine Learning Techniques", in Proceedings of E-MNLP, Jul. 2002, pp. 79-86.

Yoon Kim, "Convolutional neural networks for sentence classification", in Proceedings of EMNLP, Oct. 2014, pp. 1746-1751.

Peter D. Turney, "Thumbs up or thumbs down?: semantic orientation applied to unsupervised classification of reviews", Proceedings of the 40th Annual Meeting on Association for Computational Linguistics (ACL), Jul. 2002, pp. 417-424.

Saif Mohammad et al., "Crowdsourcing a Word-Emotion Association Lexicon", Computational Intelligence, 2012, pp. 436-465.

Bar-Haim, R., "Stance Classification of Context-Dependent Claims", in Proceedings of the 15th Conference of the European Chapter of the Association for Computational Linguistics: vol. 1, Apr. 2017, pp. 251-261.

Zaenen, A. et al, "Contextual valence shifters", in Computing attitude and affect in text: Theory and applications, Jan. 2006, pp. 1-10.

Canny Edge Detector, 1986, https://en.wikipedia.org/wiki/Canny_edge_detector.

Liu, Bing, "Sentiment analysis: Mining opinions, sentiments, and emotions" Cambridge University Press, 2015.

* cited by examiner

METHOD AND SYSTEM FOR SENTIMENT ANALYSIS

BACKGROUND

The invention relates to the field of automatic, computerized, sentiment analysis.

Sentiment analysis, also referred to as "opinion mining" or "emotion AI", is a method by which tools such as natural language processing (NLP), text analysis, computational linguistics, and machine learning, are used to determine opinions and feelings from a text. Sentiment analysis is typically applied to on-line ratings, social media posts, and other similar situations.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: receiving a text corpus comprising a plurality of n-gram tokens, wherein each of said tokens is labeled with a sentiment orientation selected from the group consisting of positive, negative, and neutral; in a training stage, training a machine learning classifier on a training set comprising said tokens, wherein each of the tokens is further labelled with a sentiment score generated by: (i) automatically calculating a scaling factor by dividing (a) the number of all those said tokens having a positive or negative sentiment orientation label, by (b) the number of all those said tokens having a neutral sentiment orientation label, (ii) automatically multiplying (a) by said scaling factor, (iii) automatically calculating a distribution probability for each of said sentiment labels, based, at least in part, on said multiplying, and (iv) automatically determining said sentiment score for each of said tokens, based, at least in part, on said distribution probability; and in an inference stage, automatically applying said machine learning classifier to a new text corpus comprising one or more n-gram tokens, to determine a sentiment orientation and a sentiment score of each of said tokens in said text corpus.

In some embodiments, said text corpus comprises textual transcriptions of contact centers interactions, and wherein said interactions are between at least an agent and a customer. In some embodiments, said contact centers interactions are associated with a specified domain.

There is also provided, in an embodiment, a method comprising: receiving a text corpus comprising a plurality of n-gram tokens, wherein each of said tokens is labeled with a sentiment orientation and a sentiment score; in a training stage, training a machine learning classifier on a training set generated by: (i) automatically identifying a token, out of said tokens, which comprises a modifying gram which affects at least one of said sentiment orientation and sentiment score of said token, (ii) automatically detecting at least one gram within a scope of influence of said modifying gram in said token, and (iii) automatically adjusting at least one of a sentiment orientation and a sentiment score of said at least one gram, based, at least in part, on a type of said modifying gram; and in an inference stage, automatically applying said machine learning classifier to a new text corpus comprising one or more n-gram tokens, to determine a sentiment orientation and a sentiment score of each of said tokens in said text corpus.

In some embodiments, said sentiment orientation is selected from the group consisting of positive, negative, and neutral.

In some embodiments, said modifying gram is a negation gram, and wherein said adjusting comprises, at least in part, automatically assigning a sentiment orientation to said at least one gram which is the opposite of said sentiment orientation of said token.

In some embodiments, said modifying gram is a sentiment intensifier gram, and wherein said adjusting comprises, at least in part, automatically increasing said sentiment score of said token, based, at least in part, on an intensity value of said sentiment intensifier gram.

In some embodiments, said modifying gram is a sentiment diminisher gram, and wherein said adjusting comprises, at least in part, automatically decreasing said sentiment score of said token, based, at least in part, on an intensity value of said sentiment diminisher gram.

There is further provided, in an embodiment, a method comprising: receiving a text corpus comprising a plurality of n-gram tokens; automatically applying a trained machine learning classifier to said text corpus, to generate a lexicon wherein each of said tokens has (a) a predicted sentiment orientation selected from the group consisting of positive, negative, and neutral, and (b) a confidence score; and selecting a plurality of said tokens for manual adjustment of said sentiment orientation, wherein said selecting is based, at least in part on: (i) said confidence score of each of said plurality of said tokens meeting a specified range, and (ii) a distribution probability of said predicted sentiment orientations within said plurality of said tokens is equal to a distribution probability of said predicted sentiment orientations in said lexicon.

In some embodiments, said machine learning classifier is further trained on a new training set comprising at least some of said selected plurality of said tokens.

In some embodiments, said confidence score is calculated based, at least in part, on applying a heuristic which takes into account at least some of: (i) a variance value of all of said sentiment orientations in said lexicon, and (ii) a hyperbolic tangent function of the number of each of said tokens in said text corpus.

There is further provided, in an embodiment, a method comprising: receiving a plurality of lexicons, wherein each of said plurality of lexicons comprises a plurality of tokens associated with a specified domain, and wherein each of said tokens has an associated sentiment orientation and sentiment score; automatically identifying, in said plurality of lexicons: (i) mutual tokens which exist in more than one of the plurality of lexicons, wherein each of said mutual tokens is assigned a sentiment score equal to a linear interpolation of each of said associated sentiment scores of said mutual token, and (ii) solitary tokens which exist only in one of said plurality of lexicons, wherein each of said solitary tokens is assigned said associated sentiment score from said one of said plurality of lexicons; and automatically generating a new lexicon in said specified domain comprising at least some of (i) and (ii).

There is further provided, in an embodiment, a system comprising: at least one hardware processor; and a non-transitory computer-readable storage medium having stored thereon program instructions, the program instructions executable by the at least one hardware processor to: receive a plurality of lexicons, wherein each of said plurality of lexicons comprises a plurality of tokens associated with a specified domain, and wherein each of said tokens has an associated sentiment orientation and sentiment score, automatically identify, in said plurality of lexicons: (i) mutual tokens which exist in more than one of the plurality of lexicons, wherein each of said mutual tokens is assigned a sentiment score equal to a linear interpolation of each of said associated sentiment scores of said mutual token, and (ii) solitary tokens which exist only in one of said plurality of lexicons, wherein each of said solitary tokens is assigned said associated sentiment score from said one of said plurality of lexicons, and automatically generate a new lexicon in said specified domain comprising at least some of (i) and (ii).

There is further provided, in an embodiment, a system comprising: at least one hardware processor; and a non-transitory computer-readable storage medium having stored thereon program instructions, the program instructions executable by the at least one hardware processor to: receive a plurality of lexicons, wherein each of said plurality of lexicons comprises a plurality of tokens associated with a specified domain, and wherein each of said tokens has an associated sentiment orientation and sentiment score; automatically identify, in said plurality of lexicons: (i) mutual tokens which exist in more than one of the plurality of lexicons, wherein each of said mutual tokens is assigned a sentiment score equal to a linear interpolation of each of said associated sentiment scores of said mutual token, and (ii) solitary tokens which exist only in one of said plurality of lexicons, wherein each of said solitary tokens is assigned said associated sentiment score from said one of said plurality of lexicons; and automatically generate a new lexicon in said specified domain comprising at least some of (i) and (ii).

There is further provided, in an embodiment, a computer program product comprising a non-transitory computer-readable storage medium having program instructions embodied therewith, the program instructions executable by at least one hardware processor to receive a plurality of lexicons, wherein each of said plurality of lexicons comprises a plurality of tokens associated with a specified domain, and wherein each of said tokens has an associated sentiment orientation and sentiment score; automatically identify, in said plurality of lexicons: (i) mutual tokens which exist in more than one of the plurality of lexicons, wherein each of said mutual tokens is assigned a sentiment score equal to a linear interpolation of each of said associated sentiment scores of said mutual token, and (ii) solitary tokens which exist only in one of said plurality of lexicons, wherein each of said solitary tokens is assigned said associated sentiment score from said one of said plurality of lexicons; and automatically generate a new lexicon in said specified domain comprising at least some of (i) and (ii).

In some embodiments, the method further comprises, and in the case of the system and the computer program product, the program instructions are further executable to, train a sentiment analysis classifier on a training set comprising at least said new lexicon; and apply said sentiment analysis classifier to a text corpus.

In some embodiments, each of said associated sentiment orientations is selected from the group consisting of positive, negative, and neutral, wherein the method further comprises, and in the case of the system and the computer program product, the program instructions are further executable to, automatically prune each of said tokens having a greater probability of being associated with (i) said neutral sentiment orientation, than with (ii) said positive and said negative sentiment orientations.

In some embodiments, said interpolation comprises weighting each of said tokens based, at least in part, on a weighted average, wherein the weights in the weighted average are assigned based on a number of occurrences of each of said tokens in said plurality of lexicons.

In some embodiments, said interpolation comprises weighting each of said tokens based, at least in part, on a weighted average, wherein the weights in the weighted average are assigned based on a confidence score of each of said tokens.

There is further provided, in an embodiment, a method comprising: receiving one or more domain-specific lexicons in a specified domain, wherein each of said domain-specific lexicons comprises a plurality of tokens having each an associated sentiment orientation and sentiment score; receiving one or more non-domain specific lexicons, wherein each of said non-domain specific lexicons comprises a plurality of tokens having each an associated sentiment orientation and sentiment score; automatically identifying, in all said domain-specific and non-domain specific lexicons: (i) a first subset of tokens which exist in one or more of the domain-specific lexicons, wherein each of said tokens in said first subset is assigned a sentiment score equal to a linear interpolation of said associated sentiment score of said token in each of said domain-specific lexicons, and (ii) a second subset of tokens which do not exist in any of the domain-specific lexicons, wherein each token in said second subset is assigned a sentiment score equal to zero; and automatically generating a new lexicon in said specified domain comprising at least some of said first and second subsets.

There is further provided, in an embodiment, a system comprising: at least one hardware processor; and a non-transitory computer-readable storage medium having stored thereon program instructions, the program instructions executable by the at least one hardware processor to: receive one or more domain-specific lexicons in a specified domain, wherein each of said domain-specific lexicons comprises a plurality of tokens having each an associated sentiment orientation and sentiment score, receive one or more non-domain specific lexicons, wherein each of said non-domain specific lexicons comprises a plurality of tokens having each an associated sentiment orientation and sentiment score, automatically identify, in all said domain-specific and non-domain specific lexicons: (ii) a first subset of tokens which exist in one or more of the domain-specific lexicons, wherein each of said tokens in said first subset is assigned a sentiment score equal to a linear interpolation of said associated sentiment score of said token in each of said domain-specific lexicons, and (ii) a second subset of tokens which do not exist in any of the domain-specific lexicons, wherein each token in said second subset is assigned a sentiment score equal to zero, and automatically generate a new lexicon in said specified domain comprising at least some of said first and second subsets.

There is further provided, in an embodiment, a computer program product comprising a non-transitory computer-readable storage medium having program instructions embodied therewith, the program instructions executable by at least one hardware processor to: receive one or more domain-specific lexicons in a specified domain, wherein each of said domain-specific lexicons comprises a plurality of tokens having each an associated sentiment orientation and sentiment score; receive one or more non-domain specific lexicons, wherein each of said non-domain specific lexicons comprises a plurality of tokens having each an associated sentiment orientation and sentiment score; automatically identify, in all said domain-specific and non-domain specific lexicons: (i) a first subset of tokens which exist in one or more of the domain-specific lexicons, wherein each of said tokens in said first subset is assigned a sentiment score equal to a linear interpolation of said associated sentiment score of said token in each of said domain-specific lexicons, and (ii) a second subset of tokens which do not exist in any of the domain-specific lexicons, wherein each token in said second subset is assigned a sentiment score equal to zero; and automatically generate a new lexicon in said specified domain comprising at least some of said first and second subsets.

In some embodiments, the method further comprises, and in the case of the system and the computer program product, the program instructions are further executable to, identify a third subset of tokens which exist in one or more of the domain-specific lexicons and one or more of the non-domain specific lexicons, wherein each of said tokens in said third subset is assigned a sentiment score equal to a linear interpolation of said associated sentiment score of said token in each of said domain-specific and non-domain specific lexicons; wherein said new lexicon further comprises at least some of said third subset.

In some embodiments, the method further comprises, and in the case of the system and the computer program product, the program instructions are further executable to, train a sentiment analysis classifier on a training set comprising at least said new lexicon; and apply said sentiment analysis classifier to a text corpus.

In some embodiments, each of said associated sentiment orientations is selected from the group consisting of positive, negative, and neutral, wherein the method further comprises, and in the case of the system and the computer program product, the program instructions are further executable to, automatically prune each of said tokens having a greater probability of being associated with (i) said neutral sentiment orientation, than with (ii) said positive and said negative sentiment orientations.

In some embodiments, said interpolation comprises weighting of each of said tokens based, at least in part, on a weighted average, wherein the weights in the weighted average are assigned based on a number of occurrences of each of said tokens in each of said domain-specific and non-domain specific lexicons.

In some embodiments, said interpolation comprises weighting each said token based, at least in part, on a weighted average, wherein the weights in the weighted average are assigned based on a confidence score of each of said tokens.

A method comprising: receiving a text corpus comprising a plurality of n-gram tokens; and automatically segmenting said text corpus into a plurality of segments based, at least in part, on sentiment orientation, by: (i) identifying one or more anchor tokens in said text corpus, wherein each of said anchor tokens has a sentiment orientation, (ii) searching for an expansion of each of said anchor tokens, wherein a boundary of said expansion is determined based on an orientation metric of said expansion meeting a specified threshold, and (iii) setting said expansion as one of said segments.

In some embodiments, said anchor token is identified based, at least in part, on an orientation score associated with said anchor token.

In some embodiments, said boundary is detected based, at least in part, on a gradient magnitude of a change in said orientation metric meeting a specified threshold.

In some embodiments, the method further comprises iteratively repeating steps (ii) and (iii) with respect to said segment.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
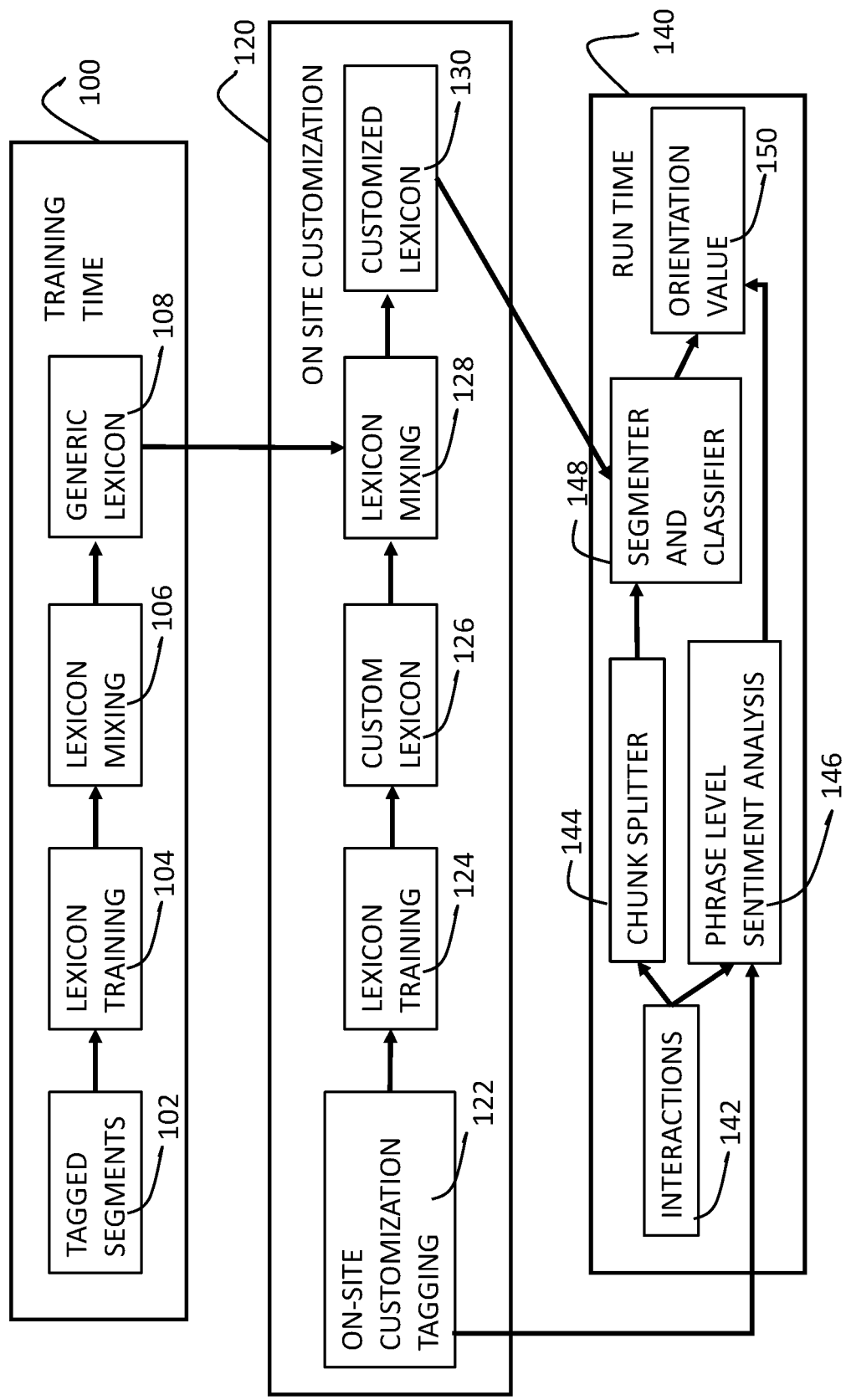
FIG. 1 is a high-level flow chart of a method for performing sentimental analysis, according to an embodiment.

Disclosed herein are methods, systems, and computer program product for performing sentiment analysis on texts, such as telephone call transcripts and electronic written communications. Techniques disclosed herein are particularly useful for sentiment analysis of call transcripts recorded in call centers, due to special characteristics of this type of human interaction.

In the contact center (CC) domain, a customer service center may receive interactions in the form of voice calls (that are later transcribed), or raw text from chats, text messages, emails, social media, Internet forum postings, and the like. The interactions are typically processed via a plurality of analysis techniques to provide, e.g., speech analytics (in the case of voice calls), topic classification, search and indexing capabilities, data mining, and/or other content-related data.

Some of the unique characteristics that are typical to SA in the CC domain are:

CC interactions are multi-modal (e.g., voice calls, chats, text messaging, email, internet postings, etc.), wherein the interaction modality may affect SA modelling.

In most CC interaction modalities, and especially in voice calls and chat conversations, the interaction is at least two sided, comprising of, e.g., an agent and a customer. Accordingly, recovering SA from these interactions may require analyzing both sides of the interaction.

CC interactions may reflect conversations of varying lengths (e.g., from a few minutes to more than one hour). Therefore, SA in the CC domain may involve detecting 'local' sentiments, e.g., in various segments of the interaction, as well as a 'global' sentiment affecting the interaction as a whole.

CC interactions, especially lengthy ones, may shift in tone and sentiment over the course of the interaction, and have a defined sentiment 'flow.' For example, an interaction may start with a positive sentiment and end on a more negative one, or may switch back and forth between positive and negative. Therefore, SA in the CC domain may require accurate segmentation of interactions, based on sentiment shifts.

Because many CC interactions are received as text transcripts of voice calls made by automatic speech recognition (ASR) systems, the input data may be noisy and affected by such issues as background noises, poor reception, speaker accent, etc.

In many CC interaction modalities, and especially in verbal interactions, the speech is informal and conversational, and does not resemble typical planned written materials. Accordingly, SA in the CC domain requires analyzing speech that is spontaneous and include, e.g., hesitations, self-repairs, repetition, and/or ill-defined sentence boundaries.

CC interactions may be subdomain-specific, wherein the subdomain may be, e.g., a general business area (e.g., wireless services, banking, retail), a specific vendor (e.g., Amazon, Verizon), and/or a specific customer service area (e.g., billing, tech support). Accordingly, SA in the CC domain may require subdomain-specific analysis models.

As used herein, the term 'lexicon' refers to a dictionary of entities and their associated sentiment scores. Lexicon entities may comprise any n-gram sequence of, e.g., tokens, words, etc. (i.e., unigrams, bigrams, trigrams). The term 'fragment' may refer to any sequence of tokens; 'segment' may refer to a fragment with time boundaries within an interaction; 'sentence' may refer to a fragment with a syntactical sense of beginning and end; and 'chunk' may refer to any one or more sentence(s) or a segment(s).

A potential advantage of the present invention is, therefore, in that, the classifier training leverages generic CC interactions and external known CC lexicons with ID-specific CC interactions, to generate a model which can be readily adopted for new domains without requiring large amounts of domain-specific manually-labeled data.

Reference is now made to FIG. 1 which is a high-level flow chart of a method for performing sentiment analysis, according to present embodiments. The method is executed in three different phases: a first phase, training time 100, a second phase, on-site customization 120, and a third phase, run time 140.

During training time 100, tagged segments 102 are provided to a machine learning system, which executes the following steps. The tagged segments 102 are subjected to lexicon training 104, where predictions of sentiment are made in both an in-domain lexicon (which includes terminology and jargon expected to be found in the pertinent call center) and an out-of-domain lexicon (i.e., a lexicon including casual, day-to-day terminology that is not unique to any specific industry, business, or the like) based on the tagging in the segments. The in-domain lexicon and the out-of-domain lexicon are mixed 106 in order to output a generic lexicon 108.

During on-site customization 120, that is performed at or by the pertinent call center, segments provided based on-site customized material are tagged 122. The tagged on-site customized material from step 122 is then subjected to lexicon training 124, as in step 104 above. A custom lexicon 126 is thereby produced. The custom lexicon 126 and the generic lexicon 108 are then mixed 128. A customized lexicon 130 is thereby produced.

At run-time 140, client-agent interactions 142 are input into a chunk splitter 144. The resulting chunks are then segmented and classified 148 as to the orientation of their sentiment. The client-agent interactions 142 are also subjected to phrase level sentiment analysis 146. The phrase level sentiment analysis 146 is performed using the segments which were subjected to on-site customization tagging 122. The result of the sentiment analysis on the phrases and the result of the segmented and classified chunks 148 are then used to output an orientation value 150 (i.e., positive, negative, or neutral) of the client-agent interaction for later analysis.

Following are particular techniques which may be executed in the framework of the method of FIG. 1, or in any other sentiment analysis process.

Lexicon Training with Neutral Factoring

In some embodiments, the present invention provides for training a machine learning classifier on one or more training sets generated from a corpus of labeled CC interaction fragments. In some embodiments, the corpus of labeled CC interaction fragments may comprise one or more of generic CC interactions, ID CC interactions, and/or additional or other textual corpora.

In some embodiments, the one or more training sets may be based, at least in part, on class priors P (s) of each sentiment within the corpora (i.e., a prior probability of a word's polarity or emotion association), in a way that does not allow neutral class priors to be overrepresented. Training data, such as labeled texts, that are used for generating lexicons, are oftentimes not perfectly labeled. Thus, the training data may include overrepresentation of neutral tokens, compared to positive and negative ones (referred to as 'polar' tokens). This, in turn, has been found by the inventors to distort the semantic orientations given to tokens by the sentiment analysis process.

Accordingly, in some embodiments, the present invention provides for scaling the count of corpora segments labeled as having a 'neutral' sentiment by a specified factor. The specified factor f may be configured for bringing the weight of the 'neutral' count closer to a desired proportion r relative to the polar counts $M_{polar}$. Accordingly, in some embodiments, factor f may be defined such that:

$$f * M_{neu} = r * M_{polar}.$$

The neutral count may then be scaled up by the factor f:

$$C'_{neu}(w) \leftarrow f * C_{neu}(w),$$

resulting in:

$$M'_{neu} = \Sigma_w C'_{neu}(w) = f\Sigma_w C_{neu}(w) = r * M_{polar}.$$

Figure 2:
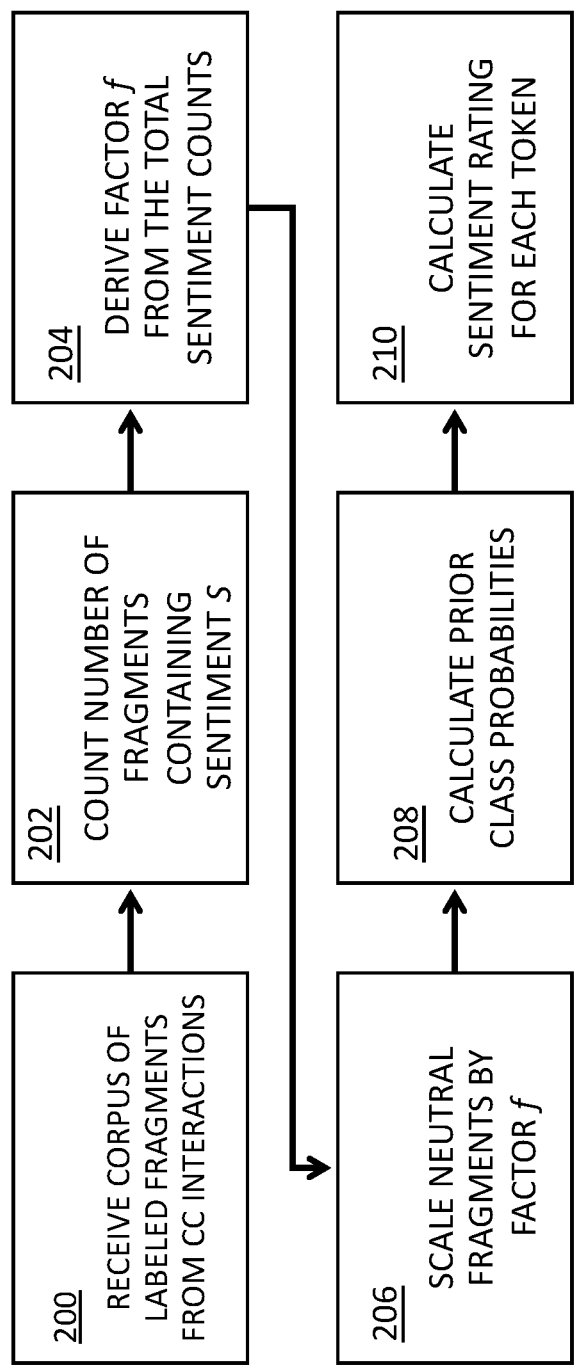
FIG. 2 is a flowchart of a process for generating one or more training sets for a contact center lexicon classifier using neutral factoring, according to an embodiment.

FIG. 2 is a flowchart of a process for generating one or more training sets for a CC lexicon classifier using neutral factoring, according to some embodiments.

At 200, a corpus of, e.g., textual transcriptions of CC interactions is received, wherein each fragment F (defined above as any sequence of tokens) is tokenized and lemmatized.

At 202, For each sentiment $s \in S$ and token w, the number of fragments F labeled with a sentiment s containing w is counted:

$$C_s(w) \leftarrow |\{F \in s | w \in F\}|.$$

At 204, the total count of neutral and polar tokens, respectively, is calculated, and factor f is derived:

$$M_{neu} = \sum_w C_{neu}(w)$$

$$M_{polar} = \sum_w C_{neg}(w) + C_{pos}(w)$$

$$f \leftarrow r \frac{M_{polar}}{M_{neu}}$$

At 206, for each distinct token w of fragment F, the neutral counts only are multiplied by factor f:

$$C_s(w) \leftarrow f * C_s(w)$$

At 208, for each sentiment s E S and token w, prior class probability P are calculated, based, at least in part, on the factoring performed in step 206:

$$P(s \mid w) \leftarrow \frac{P(w \mid s)P(s)}{P(w)} = \frac{P(w, s)}{P(w)} = \frac{C_s(w)}{C(w)} = \frac{C_s(w)}{\sum_{s \in S} C_s(w)},$$

At 210, an expected sentiment score E is calculated for each token w:

$$E_w(S) = \Sigma_{s \in S} sP(s \mid w).$$

Handling of Negations and Shifters

In some embodiments, the present invention may be configured for taking into account the existence of sentiment shifters in corpus fragments, so as to more accurately assign token w sentiment scores.

As used herein, the term 'sentiment shifter' or 'valence shifter' refers to words and expressions that affect the polarity of an opinion by changing its direction or its magnitude. For example, in the sentence I do not like this drug, the shifter word not before the otherwise positive word like changes the sentence polarity as a whole to negative. Generally, there are two types of shifter words or shifter trigger words:

Negations, or words that reverse the polarity of the given text (e.g., no and never), and
  Intensifiers/diminishers, which change sentiment values by degree (e.g., severe and mild).

In addition, shifters can be classified as 'local,' or words which are directly applied to polar words (e.g., the word not in This drug does not help), and 'long-distance' shifters, which allow longer-distance dependencies between the shifter words and the polar words (e.g., the word no in no one likes this drug).

Accordingly, in some embodiments, the present invention may be configured for more accurately assigning sentiment scores to tokens affected by sentiment shifter words, based, at least in part, on considering the syntactic scope of a corpus fragment under consideration.

Figure 3A:
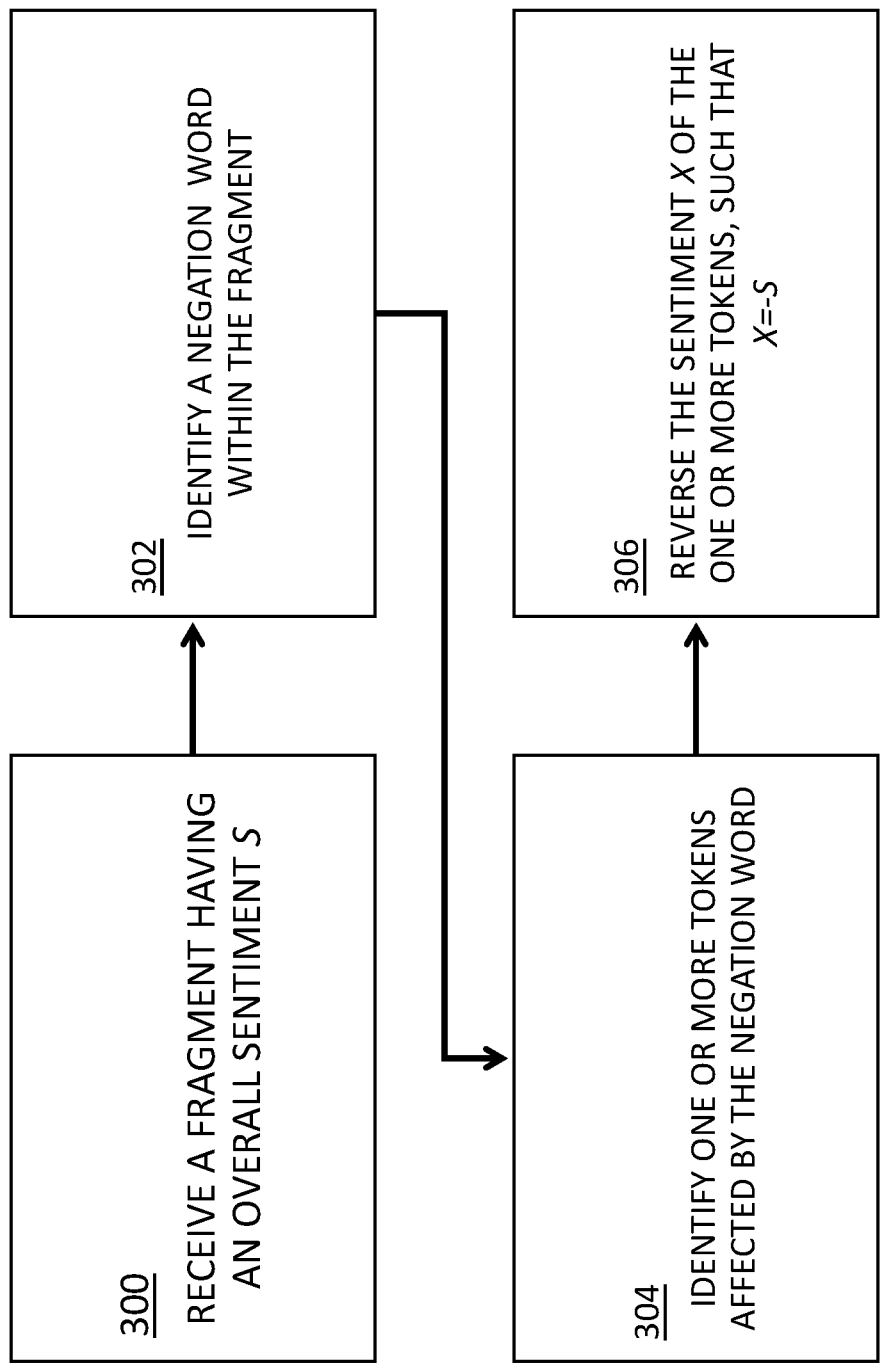
FIG. 3A is a flowchart of a process for assigning accurate sentiment orientation to tokens within a fragment, based on identifying one or more negation words within the fragment, according to an embodiment.

FIG. 3A is a flowchart of a process for assigning accurate sentiment orientation to tokens within a fragment, based, at least in part, on identifying one or more negation words within the fragment. At 300, a corpus fragment having an overall sentiment s is received, For example, the fragment may be a sentence such as now i don't have to hassle with changing. The fragment as a whole may be labeled as having a positive sentiment overall, because a customer appears to be expressing satisfaction that he or she were spared an inconvenient chore.

At 302, the negation don't may be identified within the fragment. At 304, the tokens, e.g., hassle and/or have to hassle may be identified within the scope of effect of the negation don't. Thus, the generally negative tokens hassle and/or have to hassle may be mis-assigned a positive sentiment score along with the rest of the sentence.

At 306, one or more tokens in a fragment, such as the hassle and/or have to hassle, which are identified as within the scope of negation don't, may be assigned a sentiment x, which is the opposite of sentiment s of the fragment as a whole (e.g., x=−s). In the current example, the tokens hassle and/or have to hassle may be assigned a sentiment which is the opposite (i.e., negative) of the sentiment of the entire fragment now i don't have to hassle with changing (i.e., positive).

In some embodiments, employing the above-described sentiment reversing process may result in a more accurate overall orientation scores of one or more tokens, as compared to the naive calculation. For example, assume a corpus comprises 9 fragments where the sequence what a hassle is labeled as negative with a value of −1, and 1 fragment now i don't have to hassle with changing labeled as positive with a value of +1 (assuming further that there are no neutral fragments containing the word hassle). With 'naive' counting:

$C_{pos}$(hassle)=1 and $C_{neg}$(hassle)=9 for an overall orientation score, based on mean rating, of (0.1−0.9)=−0.8.

However, when taking into account sentiment shifters:

$C_{pos}$(hassle)=0 and $C_{neg}$(hassle)=10, for an orientation score, based on mean rating, of (0−1)=−1

In some embodiments, a similar process may be performed with respect to sentiment shifters that are intensifiers/diminishers. As noted above, intensifiers/diminishers do not reverse the sentiment of the fragment, but rather increase or decrease, as the case may be, the sentiment score of the affected words (see, e.g., Polanyi, L. and Zaenen, A., 2006. Contextual valence shifters. In Computing attitude and affect in text: Theory and applications (pp. 1-10). Springer, Dordrecht.)

Figure 3B:
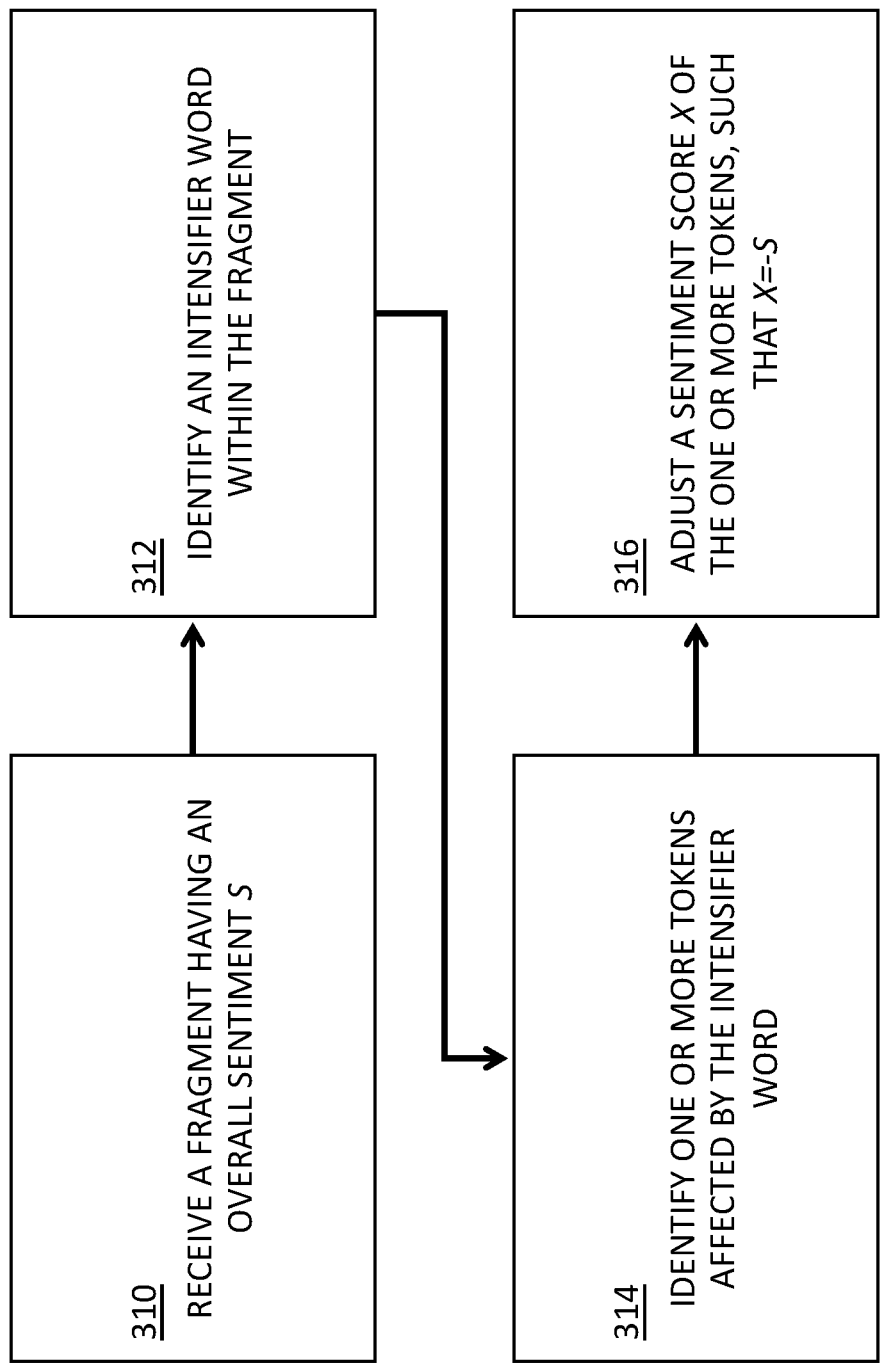
FIG. 3B is a flowchart of a process for assigning accurate sentiment orientation to tokens within a fragment, based on identifying one or more intensifiers within the fragment, according to an embodiment.

FIG. 3B is a flowchart of a process for assigning accurate sentiment orientation to tokens within a fragment, based, at least in part, on identifying one or more intensifiers within the fragment. At 310, a corpus fragment having an overall sentiment s is received, such as the fragment very cool.

At 312, the intensifier very may be identified within the fragment. At 314, the token cool may be identified within the scope of effect of the intensifier very. Thus, the generally positive sentiment of cool may be intensified by very.

At 306, a sentiment score of cool may be adjusted, based on the magnitude of the intensifier. For example, the intensifier very may be known to increase the sentiment score of the affected token cool by 1. Thus, the token cool in itself may have a sentiment score of +1, but the fragment very cool may have a positive sentiment score of +2 as a whole. To more accurately score cool, its sentiment score may be decreased by 1 (e.g., (2−1)=1). Accordingly, in some embodiments, the sentiment rating x of an affected token may be equal to s−1, where s is the sentiment score of the fragment as a whole, and 1 is the intensity of the intensifier.

Similarly, for diminishers, the sentiment rating x of an affected token is equal to s−D, where D is the intensity of the diminisher.

In some embodiments, the present invention is configured for identifying a scope of influence of sentiment shifters within a fragment. For example, the influence scope of a negation word may be determined by a fixed window of size k after the negator. In other examples, a parse tree technique may be used (see, e.g., Minqing Hu and Bing Liu. 2004. Mining and summarizing customer reviews. In Proceedings of ACM SIGKDD KDD, 168-177; Kennedy, Alistair and Diana Inkpen. Sentiment classification of movie reviews using contextual valence shifters. Computational Intelligence, 2006. 22(2): p. 110-125.1, 2, 10; Bar-Haim, R., Bhattacharya, I., Dinuzzo, F., Saha, A. and Slonim, N., 2017. Stance Classification of Context-Dependent Claims. In Proceedings of the 15th Conference of the European Chapter of the Association for Computational Linguistics: Volume 1, Long Papers (Vol. 1, pp. 251-261)). Once the scope of influence has been determined, the sentiment orientation of tokens within it may be reversed and/or adjusted, as explained above. For example, in the phrase not bad, the token bad has a sentiment score of −0.7, and the token not has a sentiment score of −0.2, for an aggregated fragment score of −0.9, although the orientation of the fragment as a whole is clearly positive. Accordingly, in some embodiments, the orientation of tokens within the scope of influence of not may be reversed, such that not bad will be—(−0.7) =+0.7 (omitting the score of the negator itself).

In some embodiments, a similar process may be performed with respect to other syntactic constructs which affect the sentiment of fragment tokens, where a syntactic construct may have a known sentiment or valence effect on other parts of a fragment. Such constructs may include, but are not limited to:

- Presuppositional items, such as adverbs like barely (e.g., it is sufficient vs. it is barely sufficient). Sufficient is a positive term, but barely sufficient presupposes that better was expected.
- Use of irony, such as in the sentence the brilliant mechanic failed to fix the car. The positive sentiment of brilliant is turned against itself by the word fail.
- Connector words, such as although, however, but, on the contrary, notwithstanding, etc., can both introduce information, and act on information elsewhere in the text. For example, in the sentence, Mike is a brilliant mechanic, but a terrible driver, while the first clause is positive, the force of but combined with the negative assessment in the main clause effectively results in a negative assessment score for the sentence.

Pruning the Lexicon

In lexicon-based sentiment analysis methods, a lexicon (also "dictionary") is generated, which lists tokens (each being an individual word or an idiom), their semantic orientation (typically "positive", "neutral", and "negative"), and the strength of that orientation (such as a value between 0% and 100%, which indicates the probability or the confidence that the token indeed possesses that polarity). Alternatively, it is also possible to represent the semantic orientation and its strength on a single scale, such as between −1 and 1: An orientation of −1 is an absolute negative, 0 is an absolute neutral, and 1 is an absolute positive—with intermediary values representation where the orientation stands between negative and neutral as well as between positive and neutral. See, for example, Ding, Xiaowen, et al. "A holistic lexicon-based approach to opinion mining." Proceedings of the 2008 international conference on web search and data mining. ACM, 2008; as well as Taboada, Maite, et al. "Lexicon-based methods for sentiment analysis." Computational linguistics 37.2 (2011): 267-307. Then, the generated lexicon is applied to a given text, to annotate its tokens in accordance with the orientations and strengths indicated by the lexicon.

Training data, such as labeled texts, that are used for generating the lexicons, are oftentimes not perfectly labeled. Much too often, the training data include overrepresentation of neutral tokens, compared to positive and negative ones (jointly referred to as "polar orientations"). This, in turn, has been found by the inventors to distort the semantic orientations given to tokens by the sentiment analysis process.

In some embodiments, the training sets of the present invention may undergo a pruning stage, wherein tokens w, which may have a greater prior probability of being part of a neutral corpus fragment than a polar corpus fragment, are discarded. In some embodiments, the prior probabilities in this stage are calculated based, at least in part, on pre-factoring prior probabilities (see step 206 above with reference to FIG. 6).

Accordingly, in some embodiments, the one or more training sets are pruned of tokens more likely to be neutral, based on class priors, as follows:

$$\forall s \in \{Pos, Neg\}, P(Neu|w) > P(s|w).$$

In some embodiments, prior class probabilities for each token $P(s|w)$ may be calculated as follows:

$$P(s \mid w) \leftarrow \frac{P(w \mid s)P(s)}{P(w)} = \frac{P(w \mid s)P(s)}{\sum_s P(w \mid s)P(s)} = \frac{P(w \mid s)}{\sum_s P(w \mid s)}$$

Supervised Customization

As noted above, in some embodiments, the present invention provides for integrating, customizing, and/or combining different in-domain and/or generic lexicons. This section will describe several exemplary methodologies which may be employed by the present invention in the course of customizing and/or combining.

Program-Based Sentiment Analysis

In some embodiments, the present invention may provide for program-based SA (PSA), wherein a custom lexicon and/or taxonomy may be integrated into a lexicon of the present invention. In some embodiments, an algorithm of the present invention performs a matching operation of phrases from the custom lexicon against the lexicon of the present invention, and assigns associated sentiment values based on the matching operation. A similar method was disclosed by the present inventors in U.S. Patent Publication No. US2017/0116173A1, filed Oct. 21, 2015, which is incorporated herein by reference.

In some embodiments, a custom lexicon may be used for generating a training set for a machine learning classifier of the present invention, using the methodology described above under "Neutral Sentiment Factoring." The training set may then be used as a standalone training set, and/or combined with other training sets in case of data sparsity.

Interactive Sentiment Analysis

In some embodiments, the present invention may provide for an interactive SA (ISA), wherein a user may initiate and/or be prompted to correct suspected classification errors, based, at least in part, on a confidence score of such classifications. In some embodiments, such user-corrected classifications may be further added to a training set to continuously train a machine learning classifier of the present invention. In some embodiments, such confidence score may be based, at least in part, on a confidence score calculated in accordance with the method disclosed under "Confidence Function for Word Orientation" below.

In some embodiments, a trained machine learning classifier of the present invention may be continuously trained on corrected classifications. For example, a phrase assigned a corrected classification by a user may then be hardwired within the present model, such that all instances of the phrase are assigned the corrected classification throughout all lexicons. In another example, a phrase that is context-dependent may not be updated globally, but rather only locally.

In some embodiments, a new training set may be constructed using user-corrected classifications, by adding corrected polarity fragments to the negative and positive data sets, respectively; adding user-rejected polarity suggestions to the neutral data set; adding the remainder of any interactions, less polar predictions of the model, to the neutral data set, such that a rejection of false accept will influence the model; and performing neutral factoring (see "Neutral Sentiment Factoring" above) on the neutral data set.

In some embodiments, model users may only label polar fragments, which means that the neutral category may be under-represented in the customer material. This may cause a problem of computing too strong orientations. This problem may be overcome by randomly sampling neutral fragments from the same type of the labeled material. The size of the sampled material is determined by taking the same proportion of neutral to polar fragments.

Confidence Function for Word Orientation

In some embodiments, in an inference stage, a trained machine learning classifier of the present invention provides for a confidence function with respect to a sentiment orientation classification of a corpus fragment. As noted above, given a training set, a count may be obtained for each of the number of occurrences of each token in each class (i.e., positive, negative, and neutral). However, using only the average scores as the sentiment orientation value is not sufficient enough, because tokens with lower overall counts are affected easily by noise and are less reliable and robust than tokens with higher counts. In addition, even tokens with similar counts can indicate different reliability levels, due to different distribution of values/variance.

Accordingly, the present invention provides for a confidence function which summarize the degree of confidence in a certain sentiment value of a token.

Analytical Method

In some embodiments, an analytical method may be employed, wherein a statistical analysis is performed of a sentiment orientation of a token. Thus, the orientation of a token is the expectation E(X) of a set of values X, based on a sample mean taken from a larger population. The sample is the various values a token w gets in a set of labeled segments it appears in, and the population is all the values of all the tokens. A significance level is then estimated that a sample mean X has certain values, given the population average μ and standard deviation σ. Accordingly, given a large enough sample size, a hypotheses test such as the Z-test may be approximated (see, e.g., en.wikipedia.org/wiki/Z-test). A Z-score may be calculated as:

$$Z^* = \frac{ME}{SE} = \frac{\overline{X} - \mu}{\frac{\sigma}{\sqrt{n}}} = \frac{E(X) - \mu}{\frac{\sigma}{\sqrt{n}}},$$

where n is the sample size, ME stands for the Margin of Error and SE for the Standard Error.

Using the standard normal cumulative function distribution Φ(Z), the significant level may be obtained, i.e. 0.8, 0.95 etc.

In some cases, a data set may have enough samples for such calculations, however, usually most of the tokens reside on a long tail of low counts, hence these statistical tests may not always provide a suitable method.

In some embodiments, a different analysis, such as a multinomial test (see, e.g., en.wikipedia.org/wiki/Multinomial test) may be used, which directly computes the probability of getting a given set of counts assuming multinomial distribution and especially fits cases with very low sample size. The meaning of this test in the present context would be "What is the probability of a given sentiment tag distribution of a token, assuming multinomial distribution of the tokens in categories"

Heuristic Method

In some embodiments, a heuristic method may be employed to calculate a confidence value given low count sets, wherein:

Conf($X$)=(1−$V(X)$)*Tan $h(\alpha|X|)$, where V(X) is the variance in sample X, Tan h( ) is a sigmoid function, α is a scaling factor, and |X| is the length of X.

The disclosed heuristic method provides for higher confidence where a token exhibits lower variance and/or a larger sample. In some cases, a confidence value may be joined with a calculated sentiment orientation, employing the uncertainty into a final sentiment orientation:

Orientation$_f$=$E(X)$*Conf($X$)=$E(X)$*(1−$V(X)$)*Tan $h(\alpha|X|)$.

Table 1 below illustrates exemplary results given low counts.

TABLE 1

Confidence Results

| Token | Orient | Neg Count | Pos Count | Neu Count | Total Count | (1 − V(x))* Tanh (Total) | Expert Rating | Conf. Orient |
|---|---|---|---|---|---|---|---|---|
| 1 | −1 | 1 | 0 | 0 | 1 | 0.1 | 2 | −0.1 |
| 2 | −1 | 2 | 0 | 0 | 2 | 0.2 | 4 | −0.2 |
| 3 | −0.5 | 1 | 0 | 1 | 2 | 0.15 | 3 | −0.075 |
| 4 | 0 | 1 | 1 | 0 | 2 | 0 | 1 | 0 |
| 5 | 0 | 0 | 0 | 2 | 2 | 0.2 | 4 | 0 |
| 6 | 0.25 | 1 | 2 | 1 | 4 | 0.12 | 3 | 0.03 |
| 7 | 0.25 | 0 | 1 | 3 | 4 | 0.31 | 5 | 0.08 |

In some embodiments, a confidence value calculated as described above may be used, e.g., for orientation updates; for filtering out low confidence tokens from a lexicon; and/or when combining different lexicons, based on weighted confidence value, as described above.

Mixing Lexicons

In some embodiments, two or more lexicons are mixed, to produce a combination lexicon that intelligently represents tokens from these distinct lexicons.

The mixed lexicons may be of a similar type (e.g., multiple in-domain lexicons or multiple out-of-domain lexicons) or of a different type (e.g., one or more in-domain lexicons together with one or more out-of-domain lexicons). The term "in-domain lexicon", as used herein, refers to a lexicon that includes tokens having a special meaning within a certain industry or business—different than its casual, day-to-day meaning. The tokens in this in-domain lexicon are labeled with orientations that are true for that certain industry or business, but may be untrue otherwise. The term "out-of-domain lexicon", as used herein, refers to a lexicon that includes only casual, day-to-day orientations of tokens, and is devoid of orientation labels that are specific to an industry or a business.

Present embodiments provide both a technique to mix lexicons of a similar type, and a technique to mix lexicons of different types.

In an exemplary embodiment, a pair of in-domain lexicons, or a pair of out-of-domain lexicons, may be mixed as follows:

For mutual tokens, namely—tokens that exist in each of the lexicons, linear interpolation may be performed. For example, if the token "latency" has an orientation of −0.9 in one lexicon, and −0.7 in another lexicon, the combined lexicon may label the orientation of "latency" as −0.8, which is the average of the two.

For solitary tokens, namely—tokens that exist in one of the lexicons but not in the other, the combined lexicon may simply include the orientation that existed in the lexicon where that token is present.

Those of skill in the art will recognize that this applies also when mixing more than two lexicons: tokens that are mutual to two of the lexicons and do not exist in one or more other lexicons may be linearly interpolated between the lexicons where they exist; tokens that exist only in one lexicon are given the orientation as in that lexicon.

In a further exemplary embodiment, an in-domain lexicon and an out-of-domain lexicon may be mixed as follows: Mutual tokens may undergo linear interpolation. Solitary tokens that exist only in the in-domain lexicon receive the orientation as in that in-domain lexicon, while solitary tokens that exist only in the out-of-domain lexicons receive a value of 0, i.e., are added with a neutral sentiment orientation.

Those of skill in the art will recognize that this applies also when mixing more than two lexicons, where at least two of the mixed lexicons are of different types: Tokens that are mutual to two or more of the lexicons, but do not exist in one or more other lexicons, may be handled as follows. If these tokens are mutual to two or more in-domain lexicons, they are linearly interpolated. If they are mutual to two or more out-of-domain lexicons, they receive a value of 0. Solitary tokens are handled as follows: If they appear only in an in-domain lexicon, they receive the same orientation as in that in-domain lexicon. If they appear only in an out-of-domain lexicon, they receive a value of 0.

In a further exemplary embodiment, an in-domain lexicon and an out-of-domain lexicon may be mixed in the following alternative manner:

Mutual tokens are not linearly interpolated, but are rather given the orientation as in the in-domain lexicon.

Solitary tokens are handled as in the previous exemplary embodiment when they appear only in the in-domain lexicon, and when appearing only in the out-of-domain lexicon they are linearly interpolated between the orientation in that lexicon and a value of 0.

Mixing of more than two lexicons operates according to the same rationale as in the previous exemplary embodiment.

In a further exemplary embodiment, each of the three above exemplary embodiments of lexicon mixing may be adapted by employing token factoring: Whenever these three exemplary embodiments employ linear interpolation, this interpolation is performed not linearly but rather by assigning weights to the same token in different lexicons based on the number of occurrences of that token in the training data used to generate each lexicon. For example, if the token "broken" received a sentiment of −1 in a lexicon based on training data where "broken" appeared 1000 times, and a sentiment of −0.2 in a lexicon based on training data where "broken" appeared 500 times, then the orientation in the combination lexicon is calculated as the weighted average:

$$\frac{(-1 \times 1000) + (-0.2 \times 500)}{1000 + 500} = -0.733.$$

In this case the ratio of the mix is the natural ratio between the source materials (0.5). If another ratio is defined, for example a ratio of 4, then we get (−1000−0.2*2000)/2500.

In some embodiments, the present invention may provide for combining of lexicons based, at least in part, on a confidence score of each token. Accordingly, given a token w with sentiment values $S_x(W)$ and $S_y(W)$, confidence values $C_x(w)$ and $C_y(w)$, from lexicons X and Y respectively, and an interpolation mix weight $\alpha$, the standard interpolation:

$$\alpha S_X(w) + (1-\alpha) S_Y(w)$$

may be further configured to be dependent on the confidence scores of $S_x(W)$ and $S_y(W)$. Accordingly, in some cases, confidence values from each of lexicon X and lexicon Y may be used alternately, wherein the other lexicon acts as the complementary:

$$\alpha C_X(w) S_X(w) + (1-\alpha C_X(w)) S_Y(w)$$

and $$(1-\alpha) C_Y(w) S_Y(w) + (1-(1-\alpha) C_Y(w)) S_X(w).$$

In some cases, an average of both approaches may be used. In yet other embodiments, a normalized updated interpolation weights approach may be used:

$$\frac{1}{\alpha C_X + (1-\alpha) C_Y}[\alpha C_X S_X + (1-\alpha) C_Y S_Y],$$

which may be adapted generally for an n lexicons case:

$$\frac{W \cdot C}{\|W \cdot C\|_1} S^T,$$

where W is the interpolation weights vector (of size n), C is the confidence vector (of size n) and S is the sentiment values vector for a given token (of size n). The operator · stands for pointwise multiplication, and $\| \|_1$ stands for the $L_1$ norm (summary of values).

In an example, let X be an ID lexicon with α=0.8, and Y an OOD lexicon and w a token (e.g., w='act') such that:

$$S_x(w)=-1, S_y(w)=0.$$

With the standard interpolation method, we get a final value of:

0.8*(−1)+0.2*0=−0.8.

With confidence update using X:

0.2*0.8*0+(1−0.2*0.8)*(−1)=−0.84.

With confidence update using Y:

0.8*0.1*(−1)+(1−0.8*0.1)*0=−0.08.

With the average method, the value is ∼−0.46
With the normalized method, [0.8*0.1, 0.2*0.8]=[0.08, 0.16], after normalizing W'=[0.33, 0.67], $S_{final}$=W'*ST=−0.33.

Adaptive Segmentation

In some embodiments, in an inference stage, the present invention may be configured for segmenting a corpus of CC interactions, based, at least in part, on a sentiment-aware adaptive algorithm for determining segment boundaries based on orientation shifts.

In some embodiments, the present algorithm may employ one or more edge detection methods, such as Canny edge detectors used in image processing (see, e.g., en.wikipedia.org/wiki/Canny_edge_detector), with several adaptations designed for application with respect to 1-dimensional sequences of textual elements. For example, in image processing, every greyscale is 'positive' and there is no notion of 'negative' and 'positive' grey levels. Therefore, the edges are determined solely by the gradients. In textual analysis, there is a notion of negative/positive anchor and there is an importance to the direction of the gradient with respect to the direction of the anchor that started the fragment. In addition, in the present case, the anchor search begins according to orientation values rather than the gradient, because detection is done according to absolute orientation value rather than relative values.

Figure 4:
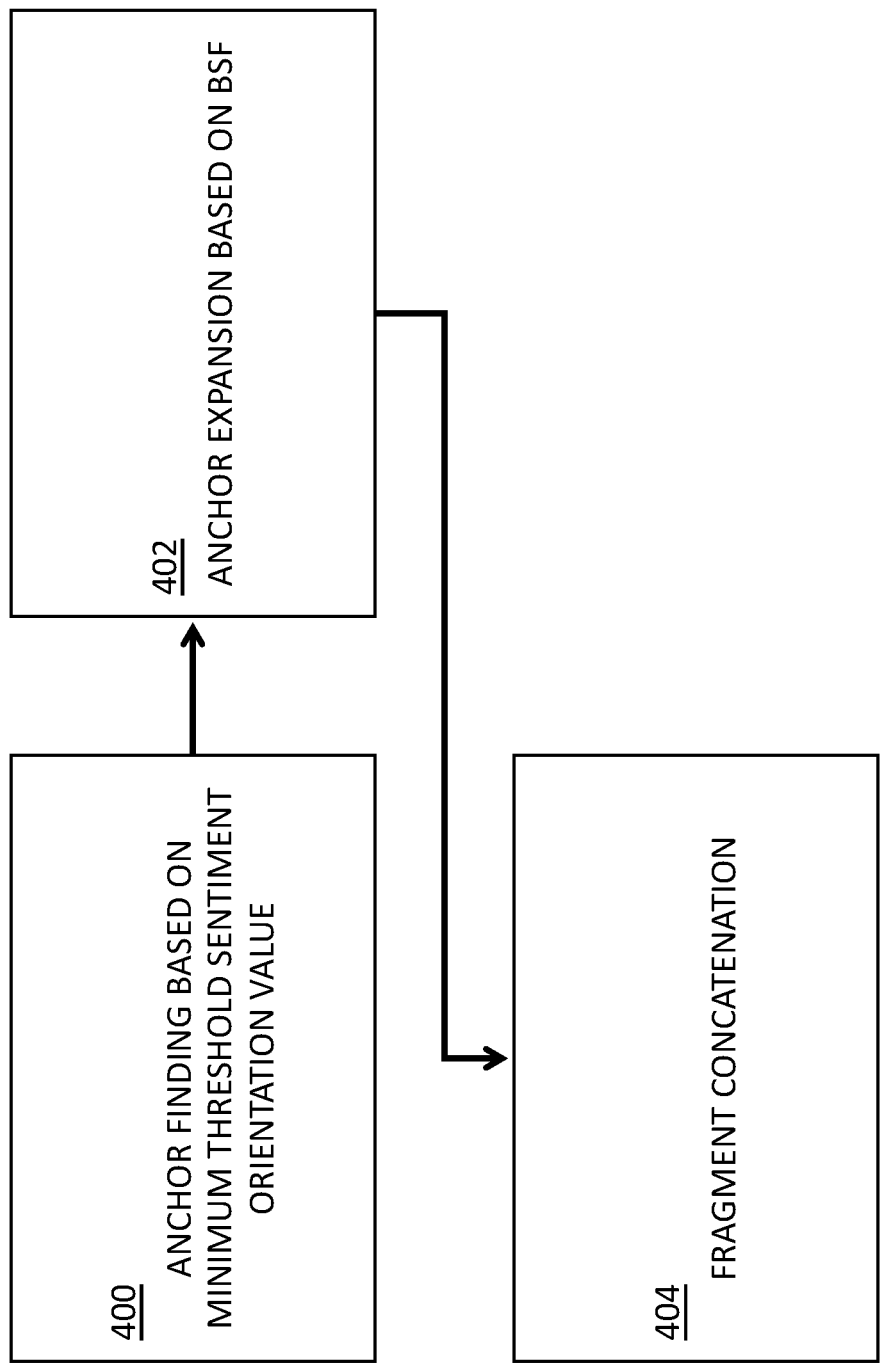
FIG. 4 is a flowchart of a process for adaptive sentiment-aware text segmentation and classification, according to an embodiment.

In some embodiments, with reference to FIG. 4, the present algorithm works in three stages:
a) At 400, 'anchors' are being identified, i.e., tokens within the corpus words with a strong sentiment orientation;
b) at 402, the anchors are expanded to their sides until the gradient magnitude of the orientation values jumps above an exit threshold in the opposite direction of the anchor's orientation; and
c) at 404, fragments are concatenated which overlap with each other or are close enough.

In some embodiments, the anchor expansion stage may employ an iterative breadth-first search (BFS) which scans all segments containing the identified anchor and which fulfill the criteria in increasing length. More particularly, the expansion is performed using a search in segments represented by a state space (s, e) of start and end indices, respectively. The search may be bidirectional, i.e., the search tree starts from the anchor and expands in both directions, to the right and the left. If one side's expansion is successful, the new segment is added to a queue. The next iteration may start by taking a segment from the queue and expanding it in the same bidirectional manner. If a state has been already visited before, the algorithm does not continue the search tree under that branch. The gradient may then be calculated using the sentiment value of the new token with respect to the previous average. If it passes, the average is updated to include the new value, and if not, a 'lookahead' procedure is performed, wherein the next candidates in the same direction are evaluated to see if the failure is only a fluctuation and that the signal 'recovers.'

In some embodiments, the anchor finding stage 400 may comprise searching for tokens with absolute orientation that is greater than a specified threshold. In some embodiments, different thresholds may be sued for negative and positive anchors. In some embodiments a 'stop' list may include anchors to be ignored (e.g., "my"), and/or a 'whitelist' may include anchors to be included (e.g., negations: "not", "n't").

In some embodiments, anchor expansion stage 402 may be performed as follows: Let token α be represented by the triple value (i, text, orientation), and fragment F be an anchor represented by a quadruple value (s, e, text, orientation). For simplicity, the anchor and anchor fragment may be treated here as time segments, without text and total orientation properties. Accordingly, an expansion algorithm of the present invention may comprise the following steps:

```
Expand(a):
    f ← [a.i, a.i]          # Initialize a segment with the given anchor
    Set queue q = {f}        # Initialize a queue with the anchor segment
    ā ← S[a]                 # Initialize the current average to the anchor's
                               orientation
    While q is not empty     # S is a sentiment orientation map
        f = dequeue(q)
        If Length(f) < MAX_LEN
            If f.e ≠ Right boundary
                If segment [f.s, f.e+1] wasn't visited before
                    (f.e, success, ā) ← ExpandSideLookahead_(f.e, +1, ā, f)
                    If success
                        Add [s, e] to q
            If f.s ≠ Left boundary
                If segment [f.s-1, f.e] wasn't visited before
                    (f.s, success, ā) ← ExpandSideLookahead (f.s, -1, ā, f)
                    If success
                        Add [s, e] to q
            If wasn't expanded keep f in a list F
    f ← the longest/strongest f from F
    If f's orientation sign is opposite to the anchor's return False
```

In some embodiments, a lookahead expansion algorithm of the present invention may comprise the following steps:

```
ExpandSideLookahead (i, step, ā, f):
# a is the anchor
# w is the fragment's token sequence
    For ℓ in 0 to K          # K - lookahead maximum length
        next ← S[w[i+step*(ℓ + 1)]]
        g ← next - ā         # g = ∂s/∂t · Here ∂t is 1 rather than ℓ + 1
        exceeds ← (|g|>2MAX_GRAD) and (Sign(g) = −Sign(S[a]))    OR
                  |next| < MIN_VAL                                OR
                  Sign(next) = −Sign(S[a])
        If not exceeds       # If exceeds continue in lookahead
            i ← i + step * (ℓ + 1)
            ā ← the new average until next
    Mark segment [min(f.s, i), max(f.e, i)] as visited
```

-continued

```
Return (i, True, ā)
Return False
```

In some embodiments, the present algorithm may employ Language Modeling (LM) score as orientation function. Accordingly, the following transformations may apply:
(i) a next iteration is calculated based on Orientation$_{LM}$ of the entire next fragment;
(ii) $\bar{\alpha}$ of a fragment F is calculated by Orientation$_{LM}$(F); and
(iii) S[ ] is given by the Orientation$_{LM}$ function.
Wherein the function Orientation$_{LM}$ is defined as:

$$Orientation_{LM}(f) = \frac{LM_{pos}(f) - LM_{neg}(f)}{LM_{neu}(f)}$$

In some embodiments, fragments comprising sentiment shifters and/or other syntactic structures will be treated as described above under "Handling of Sentiment Shifters."

In some embodiments, the present invention provides for de-amortization of a lookahead average. For example, in a lookahead state, if a candidate token recovers the signal, the prev_avg←max(prev_avg,new_avg), or min(prev_avg,new_avg), in case of negative fragment, are updated, so that the lookahead procedure does not decay the criteria average, but rather increases it. Accordingly, the step $\bar{\alpha}$←the new average until next is updated to:

$\bar{\alpha}'$←the new average until next

If Sign($\bar{\alpha}$)=Sign($\bar{\alpha}'$)

$\bar{\alpha}$←Sign($\bar{\alpha}$)*Max(|$\bar{\alpha}$|,|$\bar{\alpha}'$|) # $\bar{\alpha}$ cannot get lower In some embodiments, at a step 404, fragments are concatenated. In such embodiments, the anchor fragments may be sorted lexicographically by start time ascending, end time descending. Then, for each fragment F, If F is close enough (gap parameter) to the previous one, they are concatenate (including the gap). A confidence/normalization is calculated for the resulting concatenated fragment using a Tan h function.

Brief Discussion of Experimental Results

Experiments conducted by the inventors demonstrated that a machine learning algorithm trained in accordance with certain embodiments of the present invention may enhance the accuracy in sentiment analysis of input CC interactions. Two types of experiments were conducted:

Training the algorithm on a training set comprising in-domain (ID) training materials. As noted above, ID materials may include terminology and jargon used in a specific business domain, where a meaning of certain tokens in this domain may be different than their meaning in day-to-day, generic discussions.

Training the algorithm on a training set comprising non-domain-specific materials (i.e., out-of-domain, or OOD). OOD materials may include training data comprising terminology used in day-to-day conversations that are not uniquely associated with any specific field of business or technology.

Classification results of the present invention were compared to known methods, e.g., those described in Marie-Catherine de Marneffe et al., "Was it good? It was provocative. Learning the meaning of scalar adjectives", Proceedings of the 48th Annual Meeting of the Association for Computational Linguistics, p. 167-176, Jul. 11-16, 2010.

The experiments' results reflect an improvement in the prediction accuracy of positive and negative orientations over the benchmark method. In the testing, ID-based training demonstrated an overall improvement of 15%, and OOD training demonstrated an overall improvement of 5%, over the method proposed by Marneffe 2010, as measured by an evaluation function which measures an average weighted area under curve (AUC) of PR values (Precision-Recall).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experiments conducted and described above demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

What is claimed is:

1. A method comprising:
    receiving a plurality of lexicons, wherein each of said plurality of lexicons comprises a plurality of tokens associated with a specified domain, and wherein each of said tokens has an associated sentiment orientation and sentiment score;
    automatically identifying, in said plurality of lexicons:
        (i) mutual tokens which exist in more than one of the plurality of lexicons, wherein each of said mutual tokens is assigned a sentiment score equal to a linear interpolation of each of said associated sentiment scores of said mutual token, and
        (ii) solitary tokens which exist only in one of said plurality of lexicons, wherein each of said solitary tokens is assigned said associated sentiment score from said one of said plurality of lexicons; and
    automatically generating a new lexicon in said specified domain comprising at least some of (i) and (ii).

2. The method of claim 1, further comprising:
    training a sentiment analysis classifier on a training set comprising at least said new lexicon; and
    applying said sentiment analysis classifier to a text corpus.

3. The method of claim 1, wherein each of said associated sentiment orientations is selected from the group consisting of positive, negative, and neutral, and wherein said method further comprises automatically pruning each of said tokens having a greater probability of being associated with (i) said neutral sentiment orientation, than with (ii) said positive and said negative sentiment orientations.

4. The method of claim 1, wherein said interpolation comprises weighting each of said tokens based, at least in part, on a weighted average, wherein the weights in the weighted average are assigned based on a number of occurrences of each of said tokens in said plurality of lexicons.

5. The method of claim 1, wherein said interpolation comprises weighting each of said tokens based, at least in part, on a weighted average, wherein the weights in the weighted average are assigned based on a confidence score of each of said tokens.

6. A system comprising:
at least one hardware processor; and
a non-transitory computer-readable storage medium having stored thereon program instructions, the program instructions executable by the at least one hardware processor to:
receive a plurality of lexicons, wherein each of said plurality of lexicons comprises a plurality of tokens associated with a specified domain, and wherein each of said tokens has an associated sentiment orientation and sentiment score,
automatically identify, in said plurality of lexicons:
(i) mutual tokens which exist in more than one of the plurality of lexicons, wherein each of said mutual tokens is assigned a sentiment score equal to a linear interpolation of each of said associated sentiment scores of said mutual token, and
(ii) solitary tokens which exist only in one of said plurality of lexicons, wherein each of said solitary tokens is assigned said associated sentiment score from said one of said plurality of lexicons, and
automatically generate a new lexicon in said specified domain comprising at least some of (i) and (ii).

7. The system of claim 6, wherein said program instructions are further executable to:
train a sentiment analysis classifier on a training set comprising at least said new lexicon; and
apply said sentiment analysis classifier to a text corpus.

8. The system of claim 6, wherein each of said associated sentiment orientations is selected from the group consisting of positive, negative, and neutral, and wherein said program instructions are further executable to automatically prune each of said tokens having a greater probability of being associated with (i) said neutral sentiment orientation, than with (ii) said positive and said negative sentiment orientations.

9. The system of claim 6, wherein said interpolation comprises weighting each of said tokens based, at least in part, on a weighted average, wherein the weights in the weighted average are assigned based on a number of occurrences of each of said tokens in said plurality of lexicons.

10. The system of claim 6, wherein said interpolation comprises weighting each of said tokens based, at least in part, on a weighted average, wherein the weights in the weighted average are assigned based on a confidence score of each of said tokens.

11. A computer program product comprising a non-transitory computer-readable storage medium having program instructions embodied therewith, the program instructions executable by at least one hardware processor to:
receive a plurality of lexicons, wherein each of said plurality of lexicons comprises a plurality of tokens associated with a specified domain, and wherein each of said tokens has an associated sentiment orientation and sentiment score;
automatically identify, in said plurality of lexicons:
(i) mutual tokens which exist in more than one of the plurality of lexicons, wherein each of said mutual tokens is assigned a sentiment score equal to a linear interpolation of each of said associated sentiment scores of said mutual token, and
(ii) solitary tokens which exist only in one of said plurality of lexicons, wherein each of said solitary tokens is assigned said associated sentiment score from said one of said plurality of lexicons; and
automatically generate a new lexicon in said specified domain comprising at least some of (i) and (ii).

12. The computer program product of claim 11, wherein said program instructions are further executable to:
train a sentiment analysis classifier on a training set comprising at least said new lexicon; and
apply said sentiment analysis classifier to a text corpus.

13. The computer program product of claim 11, wherein each of said associated sentiment orientations is selected from the group consisting of positive, negative, and neutral, and wherein said program instructions are further executable to automatically prune each of said tokens having a greater probability of being associated with (i) said neutral sentiment orientation, than with (ii) said positive and said negative sentiment orientations.

14. The computer program product of claim 11, wherein said interpolation comprises weighting each of said tokens based, at least in part, on a weighted average, wherein the weights in the weighted average are assigned based on a number of occurrences of each of said tokens in said plurality of lexicons.

15. The computer program product of claim 11, wherein said interpolation comprises weighting each of said tokens based, at least in part, on a weighted average, wherein the weights in the weighted average are assigned based on a confidence score of each of said tokens.

16. A method comprising:
receiving one or more domain-specific lexicons in a specified domain, wherein each of said domain-specific lexicons comprises a plurality of tokens having each an associated sentiment orientation and sentiment score;
receiving one or more non-domain specific lexicons, wherein each of said non-domain specific lexicons comprises a plurality of tokens having each an associated sentiment orientation and sentiment score;
automatically identifying, in all said domain-specific and non-domain specific lexicons:
(i) a first subset of tokens which exist in one or more of the domain-specific lexicons, wherein each of said tokens in said first subset is assigned a sentiment score equal to a linear interpolation of said associated sentiment score of said token in each of said domain-specific lexicons, and
(ii) a second subset of tokens which do not exist in any of the domain-specific lexicons, wherein each token in said second subset is assigned a sentiment score equal to zero; and
automatically generating a new lexicon in said specified domain comprising at least some of said first and second subsets.

17. The method of claim 16, further comprising identifying a third subset of tokens which exist in one or more of the domain-specific lexicons and one or more of the non-domain specific lexicons, wherein each of said tokens in said third subset is assigned a sentiment score equal to a linear interpolation of said associated sentiment score of said token in each of said domain-specific and non-domain specific lexicons; wherein said new lexicon further comprises at least some of said third subset.

18. The method of claim 16, further comprising:
training a sentiment analysis classifier on a training set comprising at least said new lexicon; and
applying said sentiment analysis classifier to a text corpus.

19. The method of claim 16, wherein each of said associated sentiment orientations is selected from the group consisting of positive, negative, and neutral, and wherein said method further comprises automatically pruning each of said tokens having a greater probability of being associated with (i) said neutral sentiment orientation, than with (ii) said positive and said negative sentiment orientations.

20. The method of claim 16, wherein said interpolation comprises weighting of each of said tokens based, at least in part, on a weighted average, wherein the weights in the weighted average are assigned based on a number of occurrences of each of said tokens in each of said domain-specific and non-domain specific lexicons.

21. The method of claim 16, wherein said interpolation comprises weighting each said token based, at least in part, on a weighted average, wherein the weights in the weighted average are assigned based on a confidence score of each of said tokens.

22. A system comprising:
at least one hardware processor; and
a non-transitory computer-readable storage medium having stored thereon program instructions, the program instructions executable by the at least one hardware processor to:
receive one or more domain-specific lexicons in a specified domain, wherein each of said domain-specific lexicons comprises a plurality of tokens having each an associated sentiment orientation and sentiment score,
receive one or more non-domain specific lexicons, wherein each of said non-domain specific lexicons comprises a plurality of tokens having each an associated sentiment orientation and sentiment score,
automatically identify, in all said domain-specific and non-domain specific lexicons:
(i) a first subset of tokens which exist in one or more of the domain-specific lexicons, wherein each of said tokens in said first subset is assigned a sentiment score equal to a linear interpolation of said associated sentiment score of said token in each of said domain-specific lexicons, and
(ii) a second subset of tokens which do not exist in any of the domain-specific lexicons, wherein each token in said second subset is assigned a sentiment score equal to zero, and
automatically generate a new lexicon in said specified domain comprising at least some of said first and second subsets.

23. The system of claim 22, wherein said program instructions are further executable to identify a third subset of tokens which exist in one or more of the domain-specific lexicons and one or more of the non-domain specific lexicons, wherein each of said tokens in said third subset is assigned a sentiment score equal to a linear interpolation of said associated sentiment score of said token in each of said domain-specific and non-domain specific lexicons; and wherein said new lexicon further comprises at least some of said third subset.

24. The system of claim 22, wherein said program instructions are further executable to:
train a sentiment analysis classifier on a training set comprising at least said new lexicon; and
apply said sentiment analysis classifier to a text corpus.

25. The system of claim 22, wherein each of said associated sentiment orientations is selected from the group consisting of positive, negative, and neutral, and wherein said program instructions are further executable to automatically prune each of said tokens having a greater probability of being associated with (i) said neutral sentiment orientation, than with (ii) said positive and said negative sentiment orientations.

26. The system of claim 22, wherein said interpolation comprises weighting of each of said tokens based, at least in part, on a weighted average, wherein the weights in the weighted average are assigned based on a number of occurrences of each of said tokens in each of said domain-specific and non-domain specific lexicons.

27. The system of claim 22, wherein said interpolation comprises weighting each said token based, at least in part, on a weighted average, wherein the weights in the weighted average are assigned based on a confidence score of each of said tokens.

28. A computer program product comprising a non-transitory computer-readable storage medium having program instructions embodied therewith, the program instructions executable by at least one hardware processor to:
receive one or more domain-specific lexicons in a specified domain, wherein each of said domain-specific lexicons comprises a plurality of tokens having each an associated sentiment orientation and sentiment score;
receive one or more non-domain specific lexicons, wherein each of said non-domain specific lexicons comprises a plurality of tokens having each an associated sentiment orientation and sentiment score;
automatically identify, in all said domain-specific and non-domain specific lexicons:
(i) a first subset of tokens which exist in one or more of the domain-specific lexicons, wherein each of said tokens in said first subset is assigned a sentiment score equal to a linear interpolation of said associated sentiment score of said token in each of said domain-specific lexicons, and
(ii) a second subset of tokens which do not exist in any of the domain-specific lexicons, wherein each token in said second subset is assigned a sentiment score equal to zero; and
automatically generate a new lexicon in said specified domain comprising at least some of said first and second subsets.

29. The computer program product of claim 28, wherein said program instructions are further executable to identify a third subset of tokens which exist in one or more of the domain-specific lexicons and one or more of the non-domain specific lexicons, wherein each of said tokens in said third subset is assigned a sentiment score equal to a linear interpolation of said associated sentiment score of said token in each of said domain-specific and non-domain specific lexicons; and wherein said new lexicon further comprises at least some of said third subset.

30. The computer program product of claim 28, wherein said program instructions are further executable to:

train a sentiment analysis classifier on a training set comprising at least said new lexicon; and apply said sentiment analysis classifier to a text corpus.

31. The computer program product of claim 28, wherein each of said associated sentiment orientations is selected from the group consisting of positive, negative, and neutral, and wherein said program instructions are further executable to automatically prune each of said tokens having a greater probability of being associated with (i) said neutral sentiment orientation, than with (ii) said positive and said negative sentiment orientations.

32. The computer program product of claim 28, wherein said interpolation comprises weighting of each of said tokens based, at least in part, on a weighted average, wherein the weights in the weighted average are assigned based on a number of occurrences of each of said tokens in each of said domain-specific and non-domain specific lexicons.

33. The computer program product of claim 28, wherein said interpolation comprises weighting each said token based, at least in part, on a weighted average, wherein the weights in the weighted average are assigned based on a confidence score of each of said tokens.

\* \* \* \* \*